United States Patent [19]
Tsujihara et al.

[11] Patent Number: 5,298,985
[45] Date of Patent: Mar. 29, 1994

[54] IMAGE CORRECTION APPARATUS FOR ADJUSTING IMAGES BY DIGITIALLY CONTROLLING ANALOG CORRECTION WAVEFORMS

[75] Inventors: Susumu Tsujihara, Neyagawa; Yasuaki Sakanishi, Ibaraki, both of Japan

[73] Assignee: Matsushita Electric Industrial Co., Ltd., Osaka, Japan

[21] Appl. No.: 746,979

[22] Filed: Aug. 19, 1991

[30] Foreign Application Priority Data

Aug. 29, 1990 [JP] Japan .................. 2-229394

[51] Int. Cl.[5] ............................................. H04N 9/31
[52] U.S. Cl. ............................ 348/745; 315/368.12; 315/368.18; 315/368.11; 348/806; 348/807
[58] Field of Search ................... 358/60, 64, 231, 237, 358/10, 29; 315/368.11, 368.13, 368.12, 368.18, 368.21, 368.22, 368.23, 368.24; 340/793, 736, 703; H04N 9/31, 9/16, 9/18

[56] References Cited
U.S. PATENT DOCUMENTS 4,935,674  6/1990  Rodriguez-Cavazos ........... 315/368
5,111,284  5/1992  Tsujihara .............................. 358/60

FOREIGN PATENT DOCUMENTS 0324991   7/1989  European Pat. Off. .
0381421   8/1990  European Pat. Off. .
598114   12/1980  Japan .
56-157188 12/1981  Japan .

Primary Examiner—James J. Groody
Assistant Examiner—Sherrie Hsia
Attorney, Agent, or Firm—Stevens, Davis, Miller & Mosher

[57] ABSTRACT

An image correction apparatus uses digital correction data from a memory device, in which various correction data is stored, and various analog correction waveforms for implementing, through digital control, various correction, such as convergence, deflection, luminance, focus, frame phase, etc., to thereby accomplishing accurate and automatic correction.

9 Claims, 13 Drawing Sheets

FIG. 3
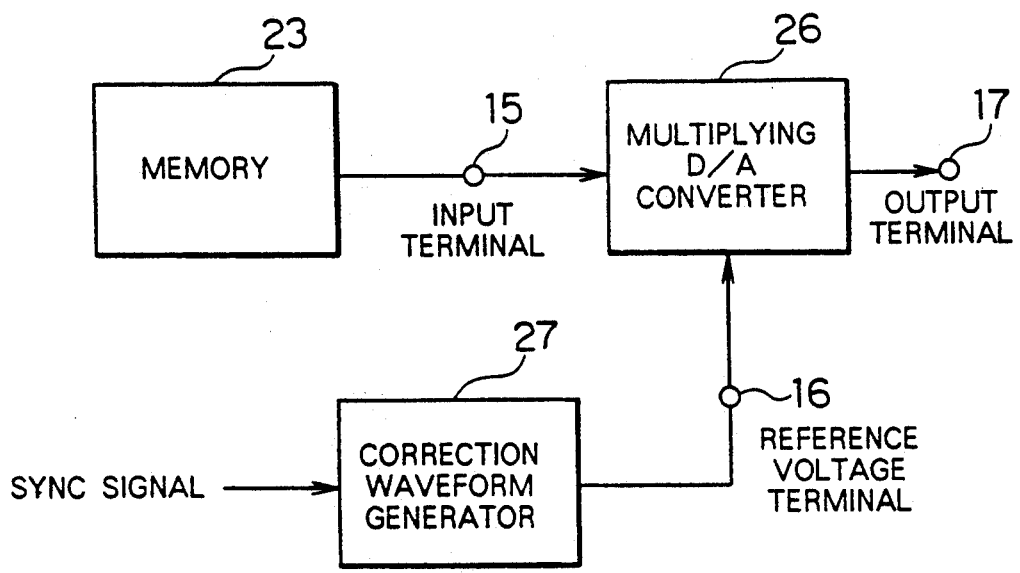
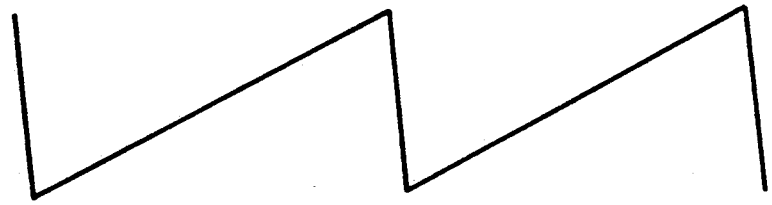
FIG. 4A
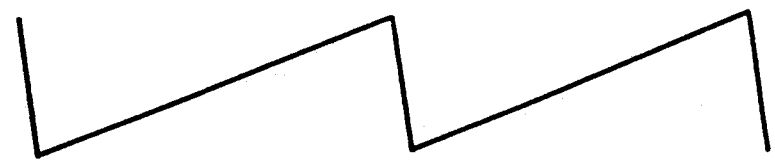
FIG. 4B
FIG. 4C
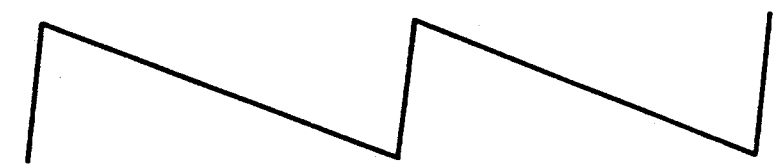
FIG. 4D FIG. 7A
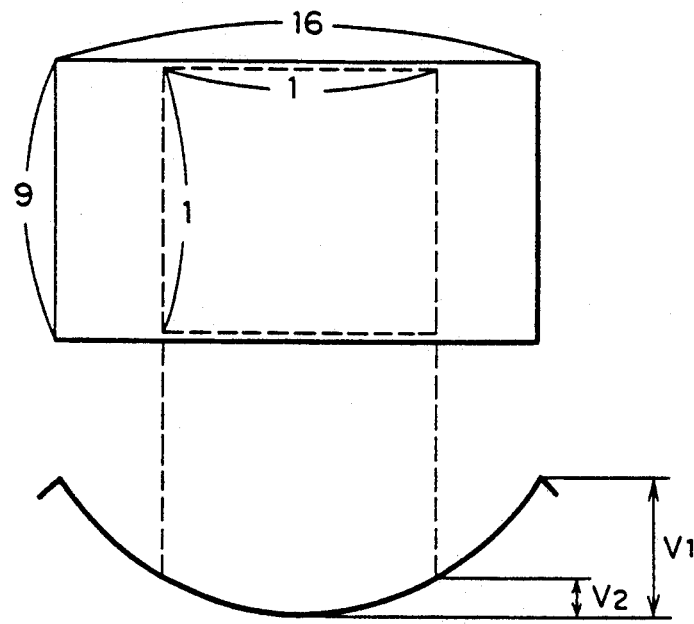
FIG. 7B
FIG. 7C
FIG. 8
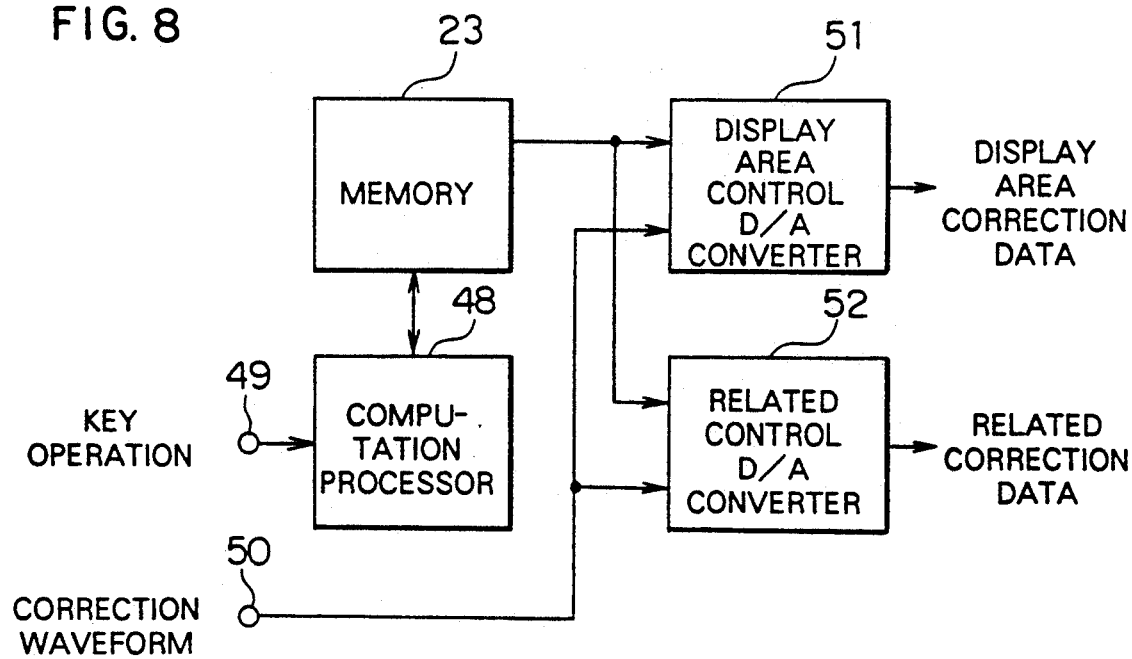

· ADJUSTMENT POINT

FIG. 11
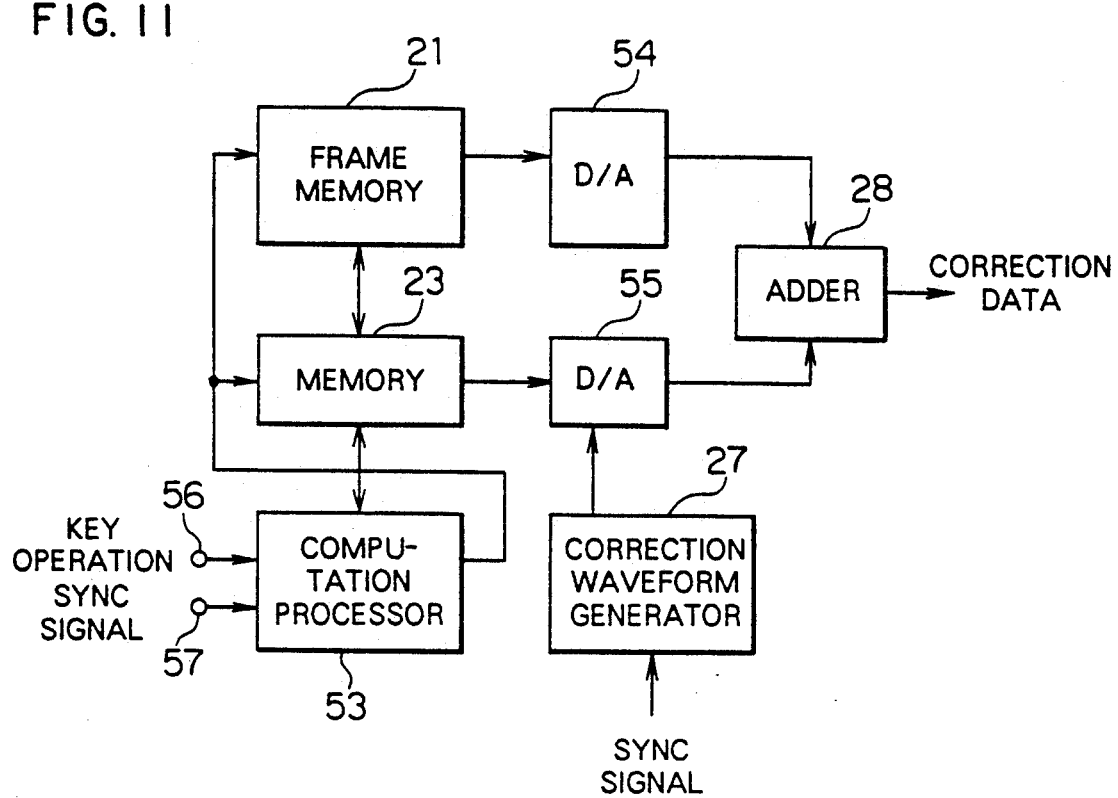
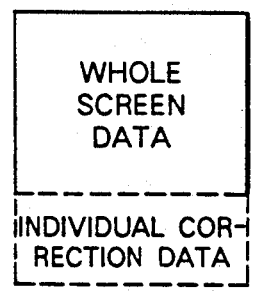
FIG. 12A
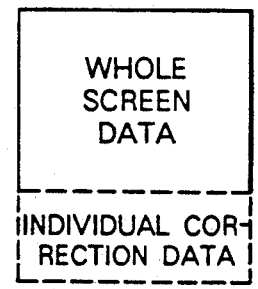
FIG. 12B
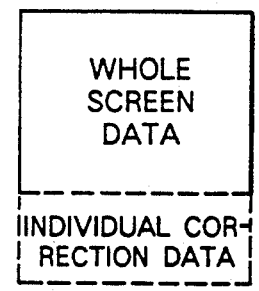
FIG. 12C
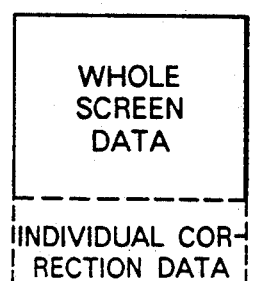
FIG. 12D
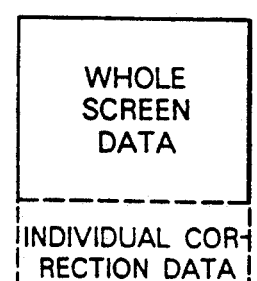
FIG. 12E
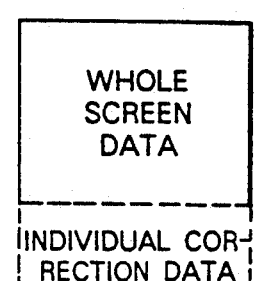
FIG. 12F

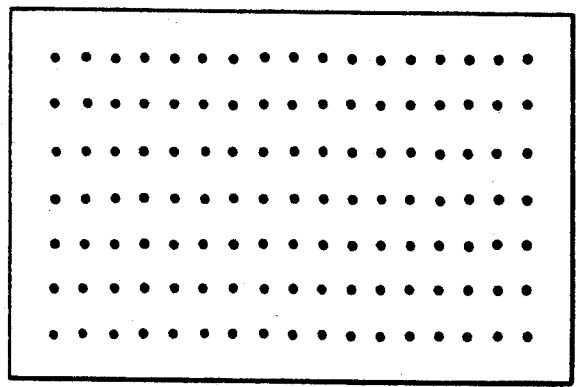
FIG. 14A DOT SIGNAL
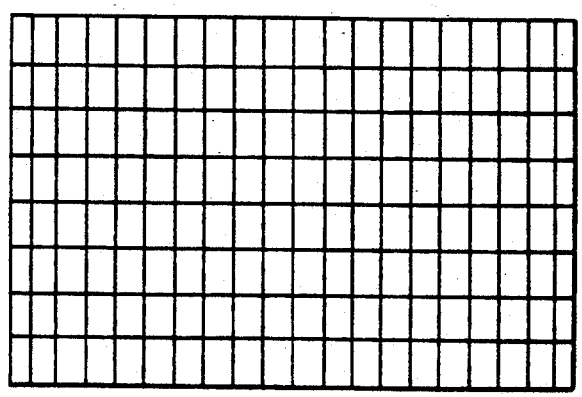
FIG. 14B CROSS-HATCH SIGNAL
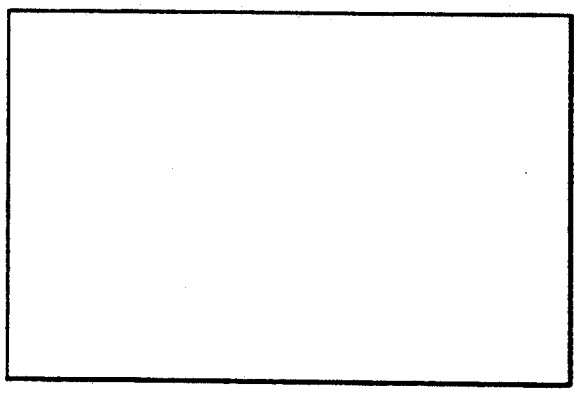
FIG. 14C WHITE SIGNAL

IMAGE CORRECTION APPARATUS FOR ADJUSTING IMAGES BY DIGITALLY CONTROLLING ANALOG CORRECTION WAVEFORMS

BACKGROUND OF THE INVENTION

1. Field of the Invention

This invention relates to an image correction apparatus for the adjustment of an image which is received and displayed on a color television receiver, and particularly to a digital image correction apparatus which controls various correction waveforms in a digital manner, thereby implementing accurate and automatic image correction.

2. Description of the Prior Art

Generally, a video projector which performs enlarged projection on a screen by using three projection tubes, which emit three primary colors, involves such adversities as displacement of colors, out-of-focus, distortion of deflection and variation of brightness across the screen due to different incident angles termed "convergent angles" to the screen among the projection tubes. Although these various adverse phenomena are corrected based on the creation of analog correction waveforms in synchronism with the horizontal and vertical periods, this approximate correction scheme suffers in accuracy. Another problem is a long adjustment time is required for each item of correction because of the manual correcting operation through the visual observation of the screen. To cope with this problem, there are proposed a digital convergence apparatus in JP-B2-59-8114 as a method providing high convergence accuracy, and a digital convergence apparatus in JP-A-56-157188, as a method of automatic correction.

The conventional image correction apparatus will be explained with reference to the block diagram of FIG. 16. In a video projector formed of a projection display unit 7 and a screen 6, a pattern generator 25 projects pattern signals for items of correction on the screen so that the operator visually detects the amount of deviation and its change, and a convergence correction circuit 1, luminance correction circuit 2, focus correction circuit 3 and deflection correction circuit 4 are operated through the entry of correction data on a manual adjustment unit 5.

This apparatus, which bases the corrective operation of each item on the visual observation, performs accurate image correction. However, such a conventional image correction apparatus needs the entry of various correction data against the displacement of colors, out-of-focus, distortion of deflection and variation of luminance for each adjustment point on the screen, and therefore a long adjustment time is required and necessitates a large-scale circuit for the adjusting function of each mode.

SUMMARY OF THE INVENTION

An object of this invention is to provide an image correction apparatus for a video projector capable of performing accurate image correction in drastically reduced adjustment time through the use of automatic correction of various items such as the convergence, deflection, luminance, focus, and frame phase by using various digital correction data read out of a memory and various analog correction waveforms.

In order to achieve the above object, the inventive image correction apparatus comprises multiplication means which implements multiplication between a correction waveform which is synchronous with the sync signal and correction data which is read out of memory means and fed through a digital-to-analog (D/A) converter to thereby control the amplitude and d.c. voltage of the correction waveform, and means for driving the various correction circuits in the receiver in response to the outputs from the multiplication means. The inventive apparatus features implementing D/A conversion and multiplying operation by means of a multiplying D/A converter of serial input type, and include means for driving the various correction circuits in response to the outputs of the D/A converter. The inventive apparatus further includes control means which, when correction data of the amplitude and phase of a display area on display means is varied, varies correction data related to the display area so that the image on the display means is adjusted automatically.

According to the above-mentioned arrangement, the correction waveforms are controlled in a digital manner by the D/A converter, whereby the circuit scale can be reduced, the correction waveforms are stabilized, and various modes can be set easily through the selection of a memory area. Through the use of a serial input D/A converter, data lines can be reduced significantly. By controlling correction data related to the display area concurrently, the image is adjusted automatically even in the case of control of the amplitude or phase of the image, whereby the adjustment at each event of control is unneeded and the adjustment time can be reduced significantly.

Another image correction apparatus based on this invention comprises means for creating a correction waveform through the provision of multiple adjustment points on the screen and data interpolation between adjustment points, multiplication means for implementing multiplication between a correction waveform, which is synchronous with the sync signal, and correction data which is read out of memory means and fed through a D/A converter, summing means for summing the output of the multiplication means and whole image correction data from the waveform creation means, and means for driving various correction circuits in the receiver in response to the outputs of the summing means.

According to this arrangement, the correction waveform is created through data interpolation between adjustment points provided on the screen and a basic correction waveform is controlled by means of a D/A converter to thereby implement image correction based on the correction data produced by summing both correction data, whereby stable and accurate image correction can be accomplished. Optimal correction adapted to various signal sources can be accomplished by merely selecting a memory plane, whereby the apparatus can be simple in its arrangement.

Still another image correction apparatus based on this invention comprises computation means which displays pattern signals of various image correction modes, detects a detection signal from each correction pattern signal with a detection means, and evaluates various correction data, and means for modifying various correction data in response to the computation output and driving various correction circuits in response to the modified output.

According to this arrangement, the pattern signals for various items of image correction are displayed, the deviation and change from each pattern signal are detected, and various correction values are calculated from the detected signals, whereby automatic adjustment is made possible and the need of adjustment for the apparatus can be eliminated.

BRIEF DESCRIPTION OF THE DRAWINGS

FIG. 3 is a block diagram used to explain the operation of this embodiment;

FIGS. 4A-4D are a set of waveform diagrams used to explain the operation of this embodiment;

FIGS. 7A-7C are diagrams showing a screen and waveforms used to explain the operation of this embodiment;

FIG. 8 is a block diagram of the data control system based on this embodiment;

FIG. 11 is a block diagram of the data processing system based on this embodiment;

FIGS. 12A-12F are a set of diagrams showing the memory assignment based on this embodiment;

FIGS. 14A-14C are a set of diagrams showing display screens of pattern signals based on this embodiment;

DESCRIPTION OF THE PREFERRED EMBODIMENTS

Figure 1:
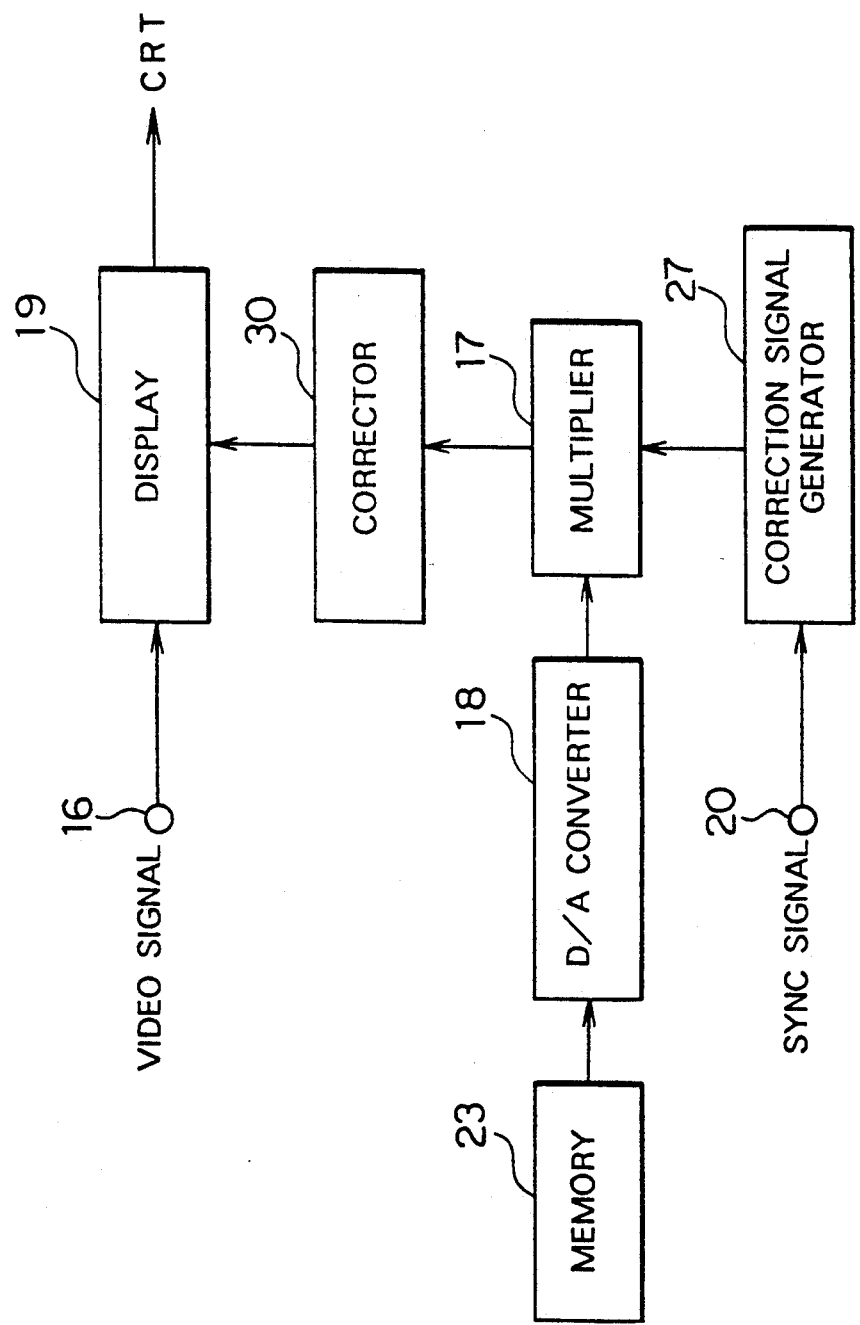
FIG. 1 is a block diagram of the image correction apparatus based on an embodiment of this invention.

In FIG. 1, indicated by 20 is an input terminal to which the sync signal is applied, 23 is a memory for storing various correction data, 27 is a correction waveform generator for producing an analog correction waveform, which is synchronous with the sync signal, from the sync signal, 18 is a D/A converter which implements digital-to-analog conversion for correction data from the memory 23, 17 is a multiplier which implements multiplication between the correction data from the D/A converter and the correction waveform from the correction waveform generator 27, 30 is a corrector which produces a correction waveform from the output of the multiplier 17, and 19 is a display circuit which drives such display unit as a CRT unit.

The operation of the image correction apparatus of this embodiment arranged as described above will be explained. The sync signal applied to the input terminal 20 is supplied to the correction waveform generator 27, by which an analog correction waveform (parabolic waveform, saw-tooth waveform, etc.) in each scanning direction is produced. The memory 23 stores correction data for the correction and control of the display circuit 19, and this digital data is converted into an analog value by a D/A converter 26. The analog data from the D/A converter 26 and analog correction waveform from the correction signal generator 27 are supplied to the multiplier 17 which implements analog multiplication. The correction waveform from the multiplier 17 is supplied to the corrector 30, by which the correction waveform for the correction and control of the display circuit 19 is produced. The correction waveform is supplied to the display circuit 19 and used for the correction of various items such as the convergence, deflection, focus, luminance, and frame phase.

Figure 2:
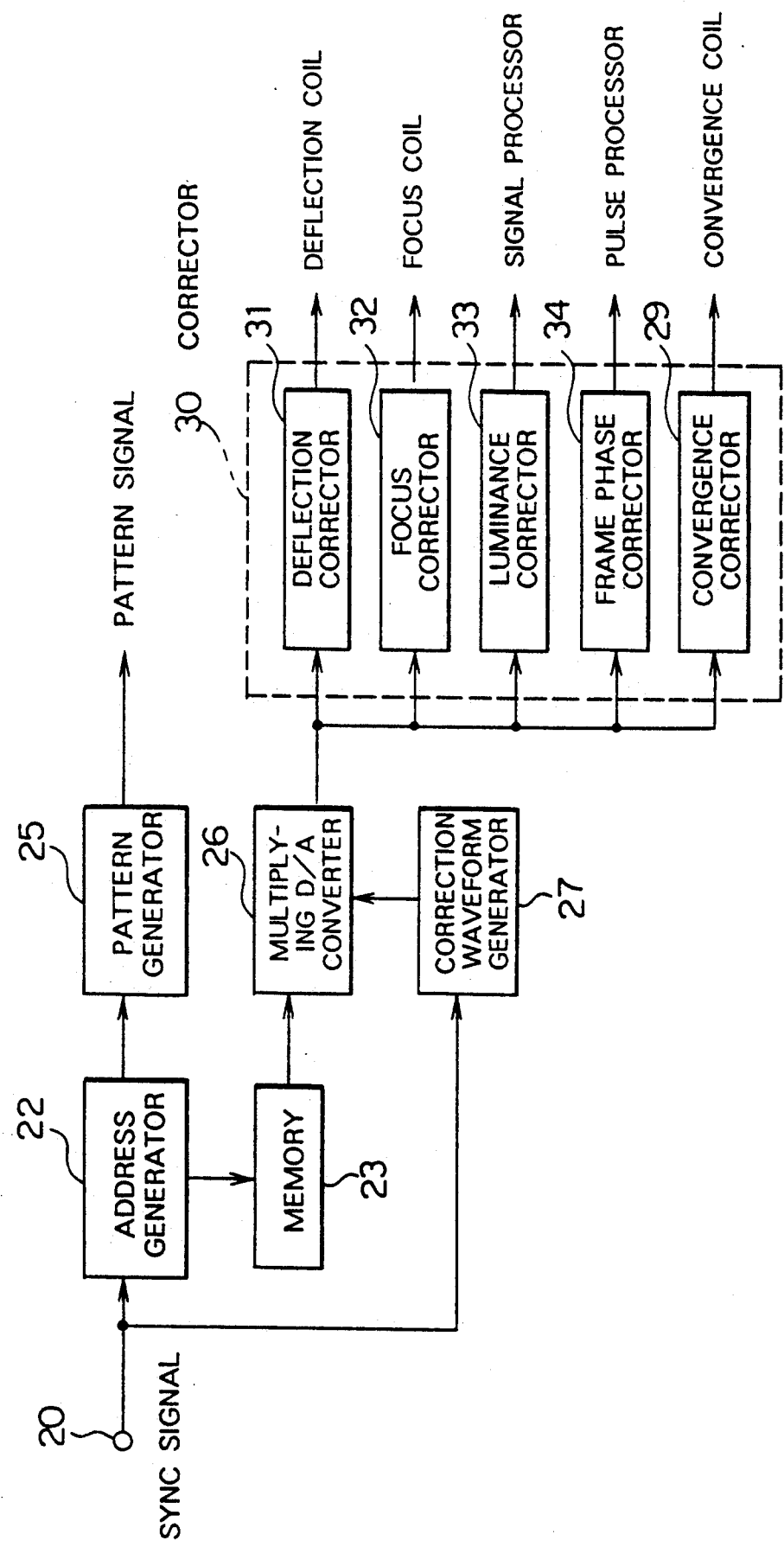
FIG. 2 is an overall block diagram used to explain the operation of this embodiment.

Next, the operation of the correction system based with respect to this invention will be explained on the block diagram of FIG. 2. In the figure, indicated by 25 is a pattern generator which produces a pattern signal in synchronism with the sync signal from the input terminal 20, 22 is an address generator which produces an address signal from the sync signal, 26 is a D/A converter which converts correction data from the memory into an analog value and implements multiplication between the converted signal and the correction waveform from the correction waveform generator 27 to thereby control the amplitude and d.c. voltage of the correction waveform, 29 is a convergence corrector which corrects the convergence, 31 is a deflection corrector which corrects the deflection distortion and amplitude, 32 is a focus corrector which corrects the electrical focus on the screen, 33 is a luminance corrector which corrects the unevenness of color and shading on the screen, and 34 is a frame phase corrector which corrects the phase, blanking (hereinafter referred as BLK) period, etc. of the picture displayed on the screen. The remaining functional blocks in FIG. 2 having identical operations as those of FIG. 1 are indicated by the same reference numbers and explanation thereof is omitted.

The following explains the operation of the image correction apparatus of this embodiment arranged as described above. The input terminal 20 receives the sync signal and the address generator 22 generates various address signals of all scanning directions, and the address signals are supplied to the pattern generator 25 and memory 23. The pattern generator 25 generates a cross-hatch pattern as shown by the display screen of FIG. 2, for example, and it is displayed on the screen. The sync signal is also supplied to the correction waveform generator 27, by which an analog correction waveform (parabolic waveform, saw-tooth waveform, etc.) in each scanning direction is produced and applied to the reference voltage input terminal of the multiplying D/A converter 26. The memory 23 stores various correction data in accordance with the address signal from the address generator 22. Digital data read out of the memory 23 is supplied to the data input terminal of the multiplying D/A converter 26. The multiplying D/A converter 26 implements multiplication between the D/A converted signal derived from the digital data and the analog correction waveform, and the amplitude and d.c. voltage of correction waveform are controlled. The correction data provided by the multiplying D/A converter 26 is supplied to the correction circuit 30 and used for the correction of various items such as the convergence, deflection, focus, luminance, and frame phase.

Next, each correction mode will be explained in detail.

The deflection corrector 31 implements deflection correction by using the correction waveform for the linearity of deflection for evenly positioning display areas of all colors on the entire screen and correction data of the picture amplitude, and drives the deflection coil (not shown).

The luminance corrector 33 implements luminance correction by using the correction waveform of luminance reduction for evening luminance (brightness) of display areas of all colors over the entire screen, and correction data of the brightness, luminance, picture quality adjustment, etc., and supplies the result to the signal processor (not shown).

The focus corrector 32 implements focus correction by using the correction waveform and data for making uniform focus (resolution) of display areas of all colors over the entire screen, and drives the focus coil (not shown).

The convergence corrector 29 implements convergence correction by using the correction waveform and data against the displacement of colors for making display areas of all colors coincident over the entire screen, and drives the convergence yoke (not shown).

The frame phase corrector 34 implements the frame phase correction by using correction data which determines the positions of display areas and blanking period, and supplies the result to the pulse processor (not shown).

Next, the operation of the multiplying D/A converter 26 and corrector 30 will be explained in detail with reference to the block diagram of FIG. 3 and the waveform diagrams of FIGS. 4A–4D. The input terminal 15 of FIG. 3 is supplied with serial correction data from the memory. The reference voltage terminal 16 is supplied with a horizontal saw-tooth waveform as shown in FIG. 4A from the correction waveform generator 27. The multiplying D/A converter 26 of FIG. 3 implements multiplication between analog data which is derived from the serial digital data from the input terminal 15 through D/A conversion and the analog correction waveform from the reference voltage terminal 16. The relation between data and correction waveforms is shown in Table 1.

TABLE 1

| Relation between data and correction waveforms | |
|---|---|
| Memory data | Correction waveform |
| 00 hex | Positive polarity (FIG. 4B) |
| 80 hex | No correction (FIG. 4C) |
| FF hex | Negative polarity (FIG. 4D) |

The output terminal 17 of FIG. 3 delivers a correction waveform with a positive polarity as shown in FIG. 4B in case data from the memory 23 has a minimum value 00 hex, a correction waveform of no correction (no signal) as shown in FIG. 4C in the case of a center data value 80 hex, and a correction waveform with a negative polarity as shown in FIG. 4D in case data has a maximum value FF hex. This means that the correction waveform has its amplitude and polarity controlled depending on data from the memory 23. Accordingly, it is possible to create a correction waveform which is optimal for each corrector. The correction waveform and data from the multiplying D/A converter 26 are supplied to the corrector 30 of FIG. 2, by which a correction waveform demanded by each correction system is created and used for correction.

Figure 5:
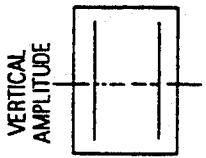
FIG. 5 is a set of diagrams showing correction waveforms and their responses based on this embodiment.

Next, the operation accompanied by convergence correction will be explained with reference to the diagrams of FIG. 5. In FIG. 5, a correction waveform of a vertical saw-tooth wave as shown by (1), for example, is supplied to the reference voltage terminal 16 of FIG. 3 so that vertical amplitude correction is implemented when it is applied to the vertical convergence coil or orthogonal correction for vertical lines is implemented when it is applied to the horizontal convergence coil. A correction waveform of a horizontal parabolic wave as shown by (4), for example, is supplied to the reference voltage terminal 16 of FIG. 3 so that correction of the curve of horizontal lines is implemented when it is applied to the vertical convergence coil or correction of linearity in the horizontal direction is implemented when it is applied to the horizontal convergence coil. In this manner, by setting a correction waveform supplied to the reference voltage terminal 16 of FIG. 3, any of the various types of correction shown in FIG. 5 can be accomplished.

In case the output of the multiplying D/A converter 26 is not a correction waveform, but is a d.c. voltage, correction can be accomplished by entering the d.c. voltage to the reference voltage terminal 16 of FIG. 3.

Figure 6:
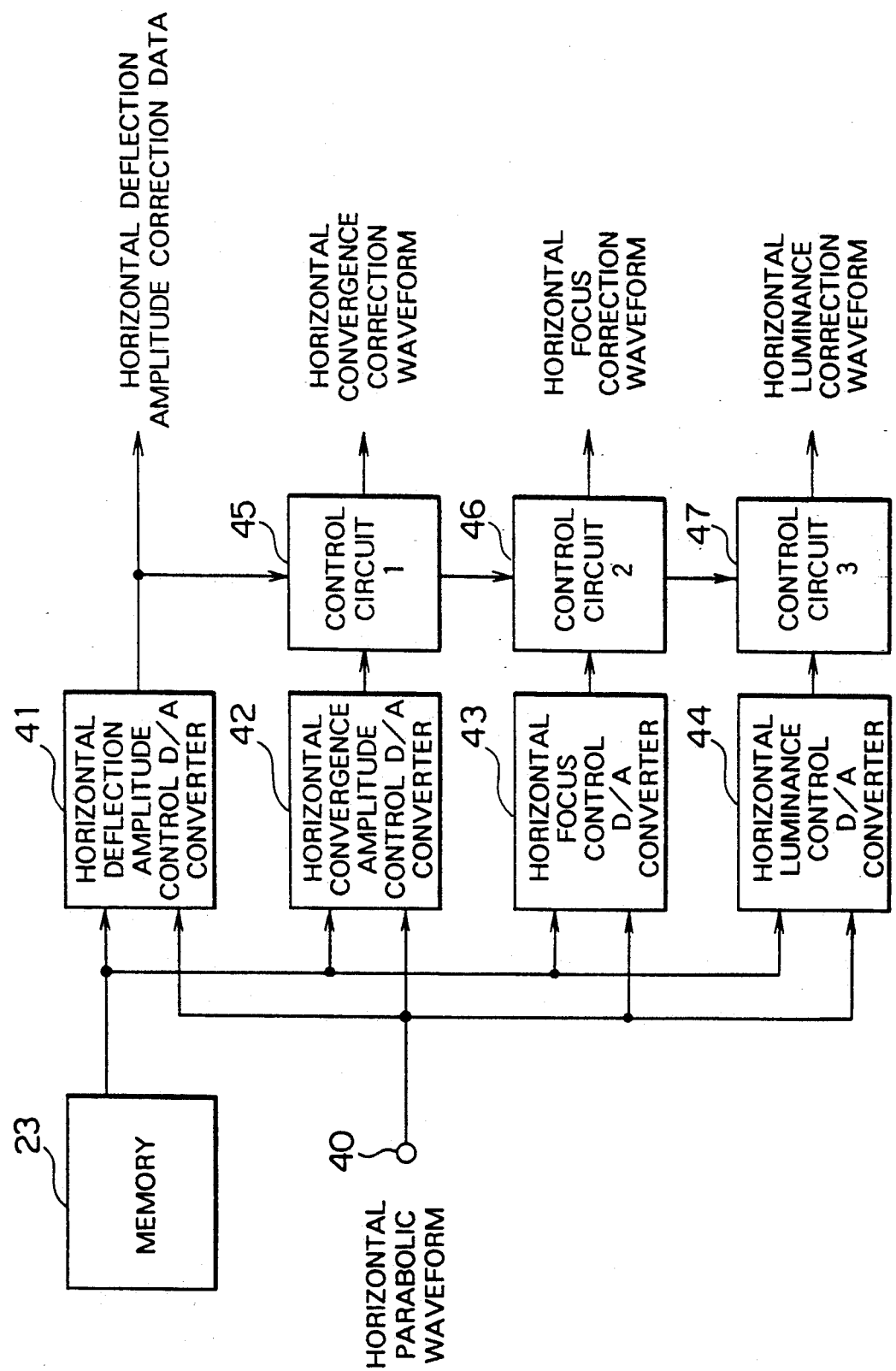
FIG. 6 is a block diagram of the data control system based on this embodiment.

Next, a control method based on another correction data, with correction data corresponding to display areas being varied, will be explained in detail with reference to the block diagram of FIG. 6 and the correction waveform diagrams of FIGS. 7A–7C. Serial data from the memory 23 shown in FIG. 6 is fed to a horizontal deflection amplitude controlling D/A converter 41, horizontal conversion amplitude controlling D/A converter 42, horizontal focus controlling D/A converter 43, and horizontal luminance controlling D/A converter 44.

Supplied to the input terminal 40 is a horizontal parabolic waveform for correction, and it is supplied to the reference voltage terminal of each D/A converter. The horizontal deflection amplitude correction data from the horizontal deflection amplitude controlling D/A converter 41 is fed to the horizontal deflection circuit and the horizontal amplitude is controlled through the control of the source voltage. Items of correction related to the horizontal amplitude are the convergence, focus and luminance, and the correction waveforms from all D/A converters 42–44 are fed to the respective control circuits 45–47. The correction data from the D/A converter 41 is fed to the control circuits 45–47, by which correction waveforms are produced in correspondence to the horizontal amplitude. In case, for a screen with an aspect ratio of 16:9 as shown by the solid line in FIG. 7A, the correction waveform is a horizontal parabolic waveform with an amplitude V1 as shown in FIG. 7B, when the horizontal amplitude is lowered to set an aspect ratio of 1:1, the spatial correction value on the screen is so large that there arise changes in the convergence, focus and luminance. On this account, correction data from the D/A converter 41 for other corrections related to the horizontal amplitude is supplied to the control circuits 45–47 to thereby produce correction waveforms in correspondence to the horizontal amplitude, and consequently a correction waveform with an amplitude V2 as shown in FIG. 7C is produced automatically.

Next, the relation among pertinent control systems corresponding to display areas will be explained with reference to the block diagram of FIG. 8.

TABLE 2

Relation between display areas and control systems

| Screen display area | Related control system |
|---|---|
| Deflection amplitude | Convergence |
| | Focus |
| | Luminance |
| | Deflection distortion |
| | Beam current |
| Frame phase | d.c. reproduction |
| | Blanking |

As shown in Table 2, the deflection amplitude has relations with the convergence, focus, luminance correction, deflection distortion and beam current, and the frame phase has relations with the d.c. reproduction and flyback period. As shown by the block diagram of the control system in FIG. 8, the arrangement differs from that of FIG. 6 in concurrent correction of correction data of related control by a computation processor 48. The input terminal 49 receives a key operation signal which selects a correction mode and enters correction data for correction through the observation of the screen. The key operation signal is fed to the computation processor 48 so that correction data of related control systems is controlled at the same time. Correction data from the memory 23 is supplied to a display area from the memory 23 is supplied to a display area controlling D/A converter 51 and a related controlling D/A converter 52. For example, when the D/A converter 51 implements the correction of the deflection amplitude, the related D/A converter 52 implements the concurrent correction for the control system shown in Table 2. When the D/A converter 51 implements the correction of the frame phase, the related D/A converter 52 implements the concurrent correction at the same time for the control system shown in Table 2.

Accordingly, by merely writing basic correction data in the memory 23 once, other correction system related to the variation of the display area is corrected automatically.

According to this embodiment, as described above, the circuit scale can be reduced, the correction waveform is stabilized and various modes can be easily set through the selection of memory area, through the implementation of correction waveform control with D/A converters and digital processing. By using serial input D/A converters, data lines can be reduced significantly. Through concurrent control of correction data related to display areas, automatic correction is carried out even in the case of control based on the frame amplitude or phase, whereby adjustment at each event becomes unnecessary and the adjustment time can be reduced significantly.

Figure 9:
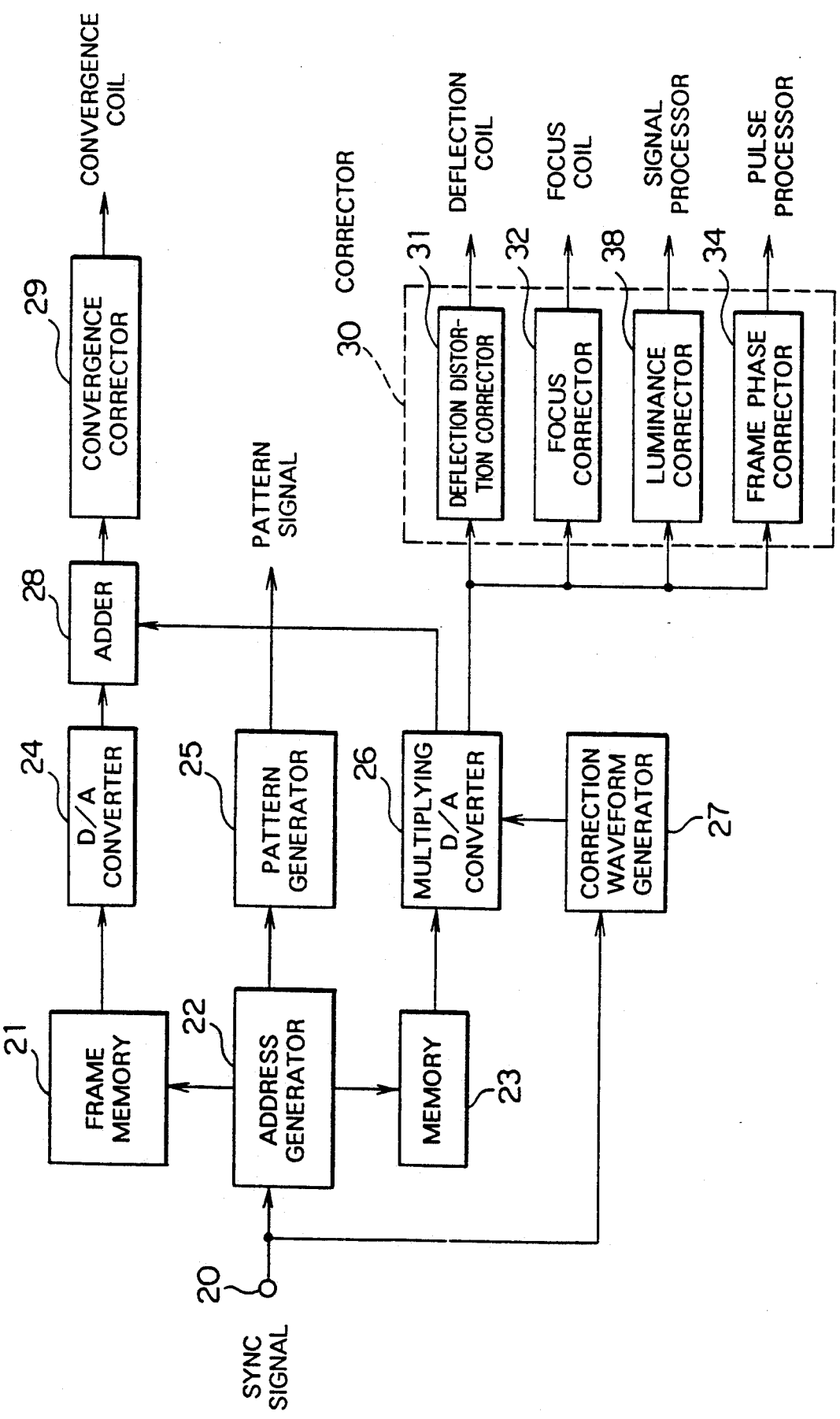
FIG. 9 is a block diagram of the image correction apparatus based on the second embodiment of this invention.
Figure 10A:
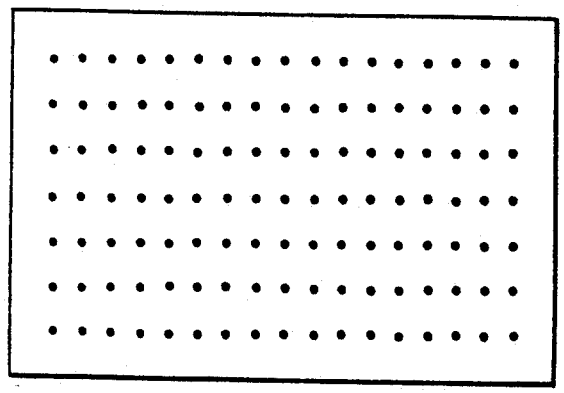
FIGS. 10A-10D are diagrams showing display screens and waveforms of this embodiment.
Figure 10B:
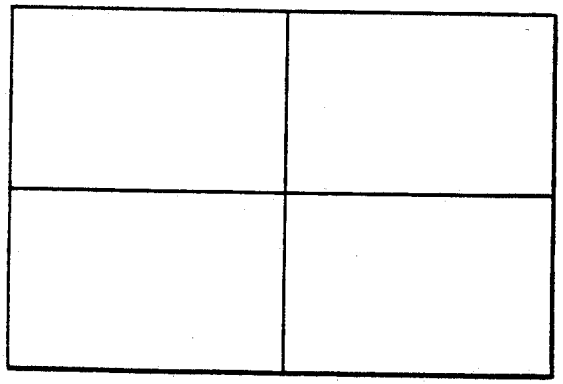
Figure 10C:
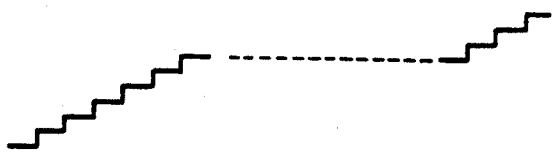
Figure 10D:
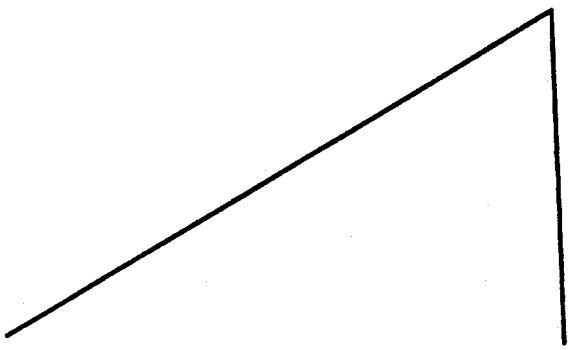

FIG. 9 and FIG. 10 show the second embodiment of this invention. This embodiment differs in arrangement from the first embodiment in that a plurality of adjustment points are provided on the screen, a correction waveform is produced through data interpolation between adjustment points, and a basic correction waveform from a multiplying D/A converter is added to the correction waveform to thereby implement correction. In FIG. 9, indicated by 21 is a frame memory for storing correction data of the entire screen, 24 is a D/A converter for converting a digital value from the frame memory into an analog value, and 28 is an adder for summing correction data of the entire screen from the D/A converter 24 and the basic correction waveform from the multiplying D/A converter 26. The remaining functional blocks having identical operations as those of the first embodiment are indicated by the same reference numbers and explanation thereof is omitted.

The image correction apparatus based on this embodiment will be explained with reference to FIGS. 10A-10D showing display screens and waveforms. The frame memory 21 shown in FIG. 9 stores correction data for a plurality of adjustment points shown in the diagram of screen of FIG. 10A, and it reads out data as a result of interpolation between adjustment points. The digital data from the frame memory 21 is fed to the D/A converter 24, by which it is converted to analog data shown in FIG. 10C. The multiplying D/A converter 26 produces a correction waveform as a result of multiplication between the data from the memory 23 and the waveform from the correction waveform generator 27. Since the correction waveform generator 27 generates only correction waveforms synchronous with the scanning period, it provides correction data on the central axes of the screen shown in FIG. 10B and a basic correction waveform shown in FIG. 10D. The correction data of the entire screen shown in 10C from the D/A converter 24 and the basic correction waveform from the multiplying D/A converter 26 are supplied to the adder 28, by which both data are summed. The added 28 has its summed output supplied to the convergence corrector which is required to have accuracy within 0.4 scanning line for high-vision display, for example.

Next, the frame memory 21 which stores correction data of the entire screen and the memory which stores correction data of all types will be explained with reference to the block diagram of FIG. 11 and the memory assignment diagram of FIG. 12. The input terminal 56 of FIG. 11 is supplied with a key operation signal and another input terminal 57 is supplied with the sync signal. The computation processor 53 discriminates relations among correction systems based on the key operation signal and implements signal discrimination based on the sync signal. The correction system discrimination signal and signal discrimination signal from the computation processor 53 are supplied to the frame memory 21 and memory 23. As shown in FIG. 12 for the memory structure, the frame memory 21 and memory 23 are formed in the same memory device. Shown by the solid line in FIG. 12 is a memory area in which correction data for the entire screen is stored, and shown by the dashed line is a memory area in which various correction data are stored. In response to the signal discrimination signal from the computation processor 53, one of memory planes (1)-(6) in FIG. 12 is selected, and optimal correction data for each mode is read out of each memory. The correction system discrimination signal is used to control correction data of each related correction system simultaneously. Control of the entire screen correction data is to control the amplification of correction data through the control of computation factors, in the case of interpolation between adjustment points, by the correction system discrimination signal. The phase of correction waveforms can be a problem in the case of correspondence to the signal sources of all types. To deal with this matter, read timing data is also included in the correction waveform in each correction data, and it controls the phase of the basic correction waveform of the correction waveform generator 27 and correction data read out of the frame memory 21.

According to this embodiment, as described above, a plurality of adjustment points are provided on the screen, data interpolation is implemented between adjustment points to thereby create a correction waveform, the basic correction waveform is controlled with the D/A converters, and correction is carried out with correction data which is the sum of both correction data, whereby stable and accurate correction is accomplished.

Figure 13:
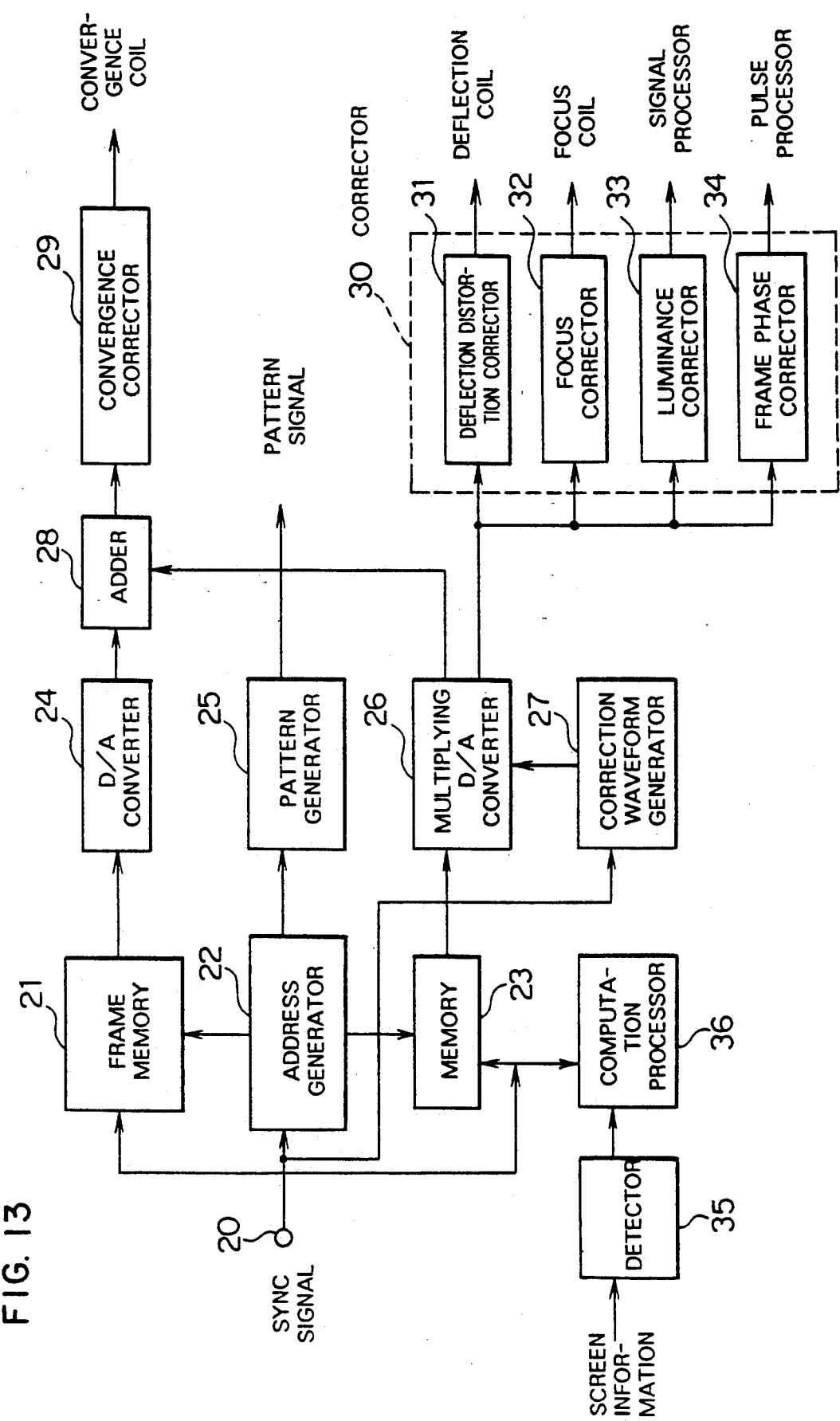
FIG. 13 is a block diagram of the image correction apparatus based on the third embodiment of this invention.
Figure 15:
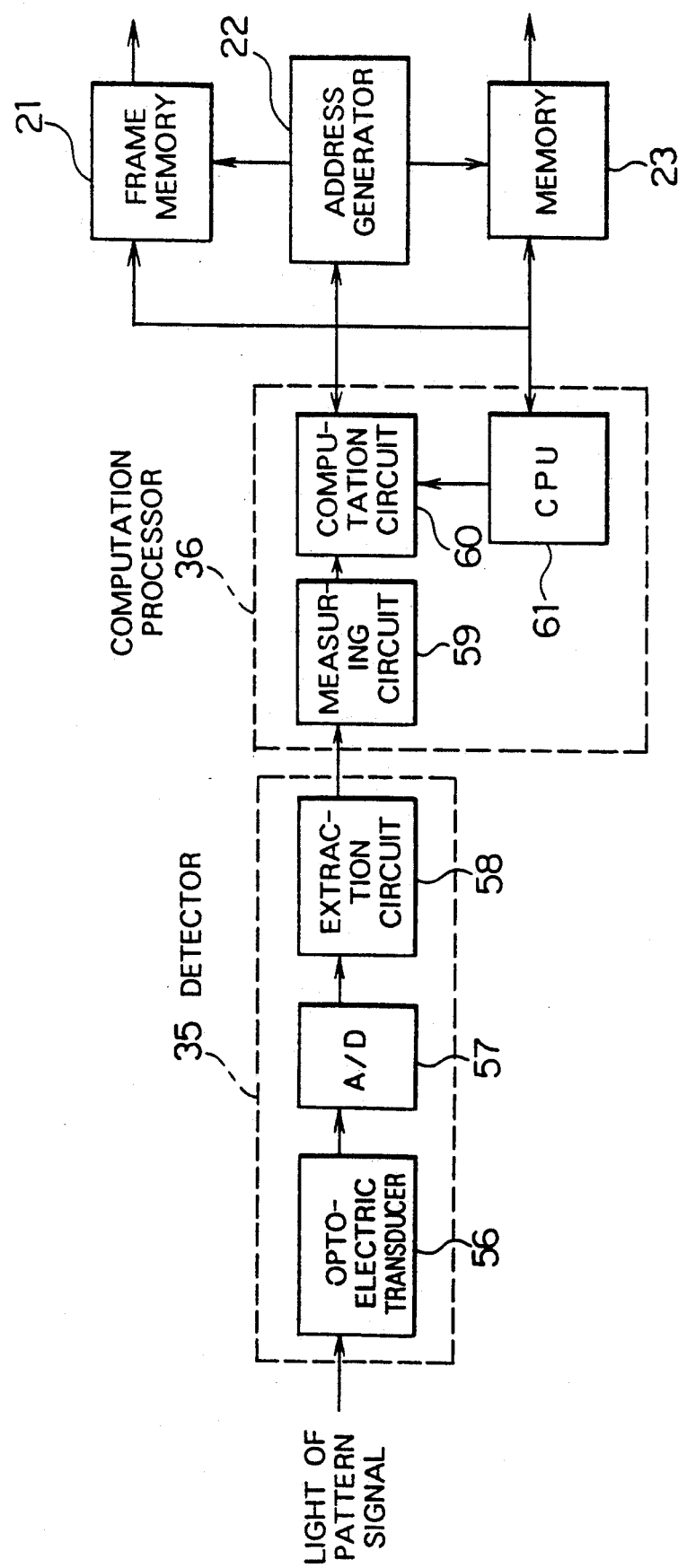
FIG. 15 is a block diagram of the detection and computation circuit based on this embodiment.
Figure 16:
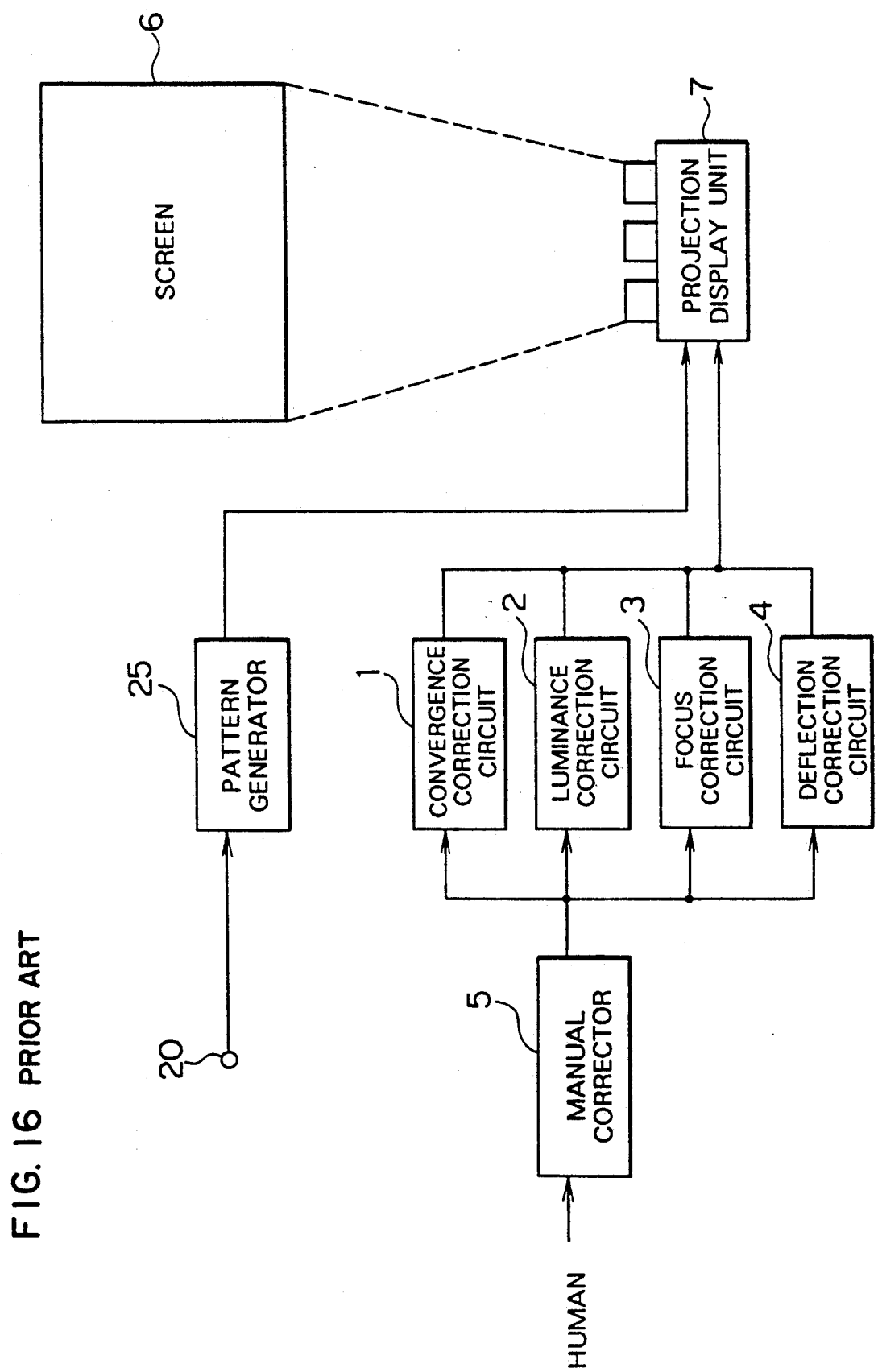
FIG. 16 is a block diagram of the conventional image correction apparatus for a video projector.

FIG. 13 to FIG. 15 show the third embodiment of this invention. It differs in arrangement from the first embodiment in that a pattern signal displayed on the screen is detected and the detected signal is used to calculate various correction data for correction. In FIG. 13, indicated by 35 is a detector for detecting the features of various pattern signals displayed on the screen, and 36 is a computation processor for calculating various correction data in response to the detected signal from the detector 35. The remaining functional blocks in FIG. 13 having the same operations as those of the first embodiment are indicated by the same reference numbers and explanation thereof is omitted.

The operation of the image correction apparatus of this embodiment arranged as described above will be explained. An input terminal 20 receives the sync signal, an address generator 22 generates various address signals, and the address signals are supplied to a pattern generator 25, by which a pattern signal for adjustment suitable for each correction mode is displayed on the screen. The adjustment pattern signal displayed is the dot or cross-hatch signal as shown in FIGS. 14A and 14B for the correction of convergence, deflection or focus, or it is the white signal shown in FIG. 14C for the correction of luminance. The pattern signal displayed on the screen (not shown) is detected for its amount of displacement and change with a detector 35 formed of an opto-electric transducer of a camera or the like. The detected signal carrying the feature from the detector 35 is supplied to the computation processor 36, by which various correction data are evaluated. The correction data corresponding to the entire screen is stored in the frame memory 21 and other individual correction data are stored in the memory 23, and these data are converted to analog values by the respective D/A converters 24 and 26. The resulting analog correction values are supplied to the corrector 30, by which the displacement of convergence, deflection distortion, fall of luminance, and out-focus are corrected.

Next, the detector 35 and computation processor 36 will be explained in detail with reference to the block diagram of FIG. 15. The detector 35 is formed of an opto-electric transducer 56, an A/D converter 57 and an extraction circuit 58. The computation processor 36 is formed of a measuring circuit 59, a computation circuit 60 and a central processing unit (CPU) 61. The opto-electric transducer 56 detects the light of each pattern signal displayed on the screen as shown in FIG. 14 to thereby detect its amount of displacement and change. The opto-electric transducer 56 has its analog signal output fed to the A/D converter 57 and converted to a digital value. The digital signal is supplied to the extraction circuit 58, by which the feature in each correction mode is detected. The positional and level information from the extraction circuit 58 are supplied to the measuring circuit 59, which implements measurement in each mode. The measured signal from the measuring circuit 59 is supplied to the computation circuit 60, which produces correction data of each correction mode in response to the control signal from the CPU 61. The correction data produced by the computation circuit 60 is fed through the data bus lines of the CPU 61 to the frame memory 21 which stores correction data of the entire screen and to the memory which stores various correction data.

TABLE 3

| Correction mode | Detection and measurement in each correction mode | |
|---|---|---|
| | Pattern signal | Measurement |
| Convergence | Hatch/dot | Position |
| Deflection | Hatch | Position |
| Focus | Hatch/dot | Level |
| Luminance | White | Level |
| Frame phase | Hatch/dot | Position |

As shown in Table 3, correction of convergence, deflection, frame phase, etc. is implemented by displaying a cross-hatch or dot signal on the screen and producing correction data through the measurement of position with respect to the reference signal position. Correction of focus is implemented by displaying a cross-hatch or dot signal and producing correction data which produces the maximum level. Correction of luminance is implemented by displaying the white signal and producing correction data which produces a uniform level.

According to this embodiment, as described above, a pattern signal on the screen is detected and various correction values are evaluated from the detected signal, whereby intricate adjustment of the video projector becomes unnecessary and the adjustment time can be reduced.

Although the foregoing first through third embodiments are the cases of video projector for the easiness of understanding, this invention is apparently effective for a direct-view type receiver having a shadow mask.

Although the foregoing second and third embodiments are the cases of convergence correction data stored in the frame memory which stores correction data of the entire screen, correction data may be of other correction system.

We claim:
1. An image correction apparatus comprising:
   display means for displaying image information;
   a plurality of correction means for adjusting an image displayed by said display means;
   correction signal generating means for generating a basic analog correction signal;
   means for storing digital correction data and generating serial digital correction signals corresponding to said plurality of correction means;
   serial data input conversion means for receiving said serial digital correction signals implementing digital-to-analog conversion of said serial digital correction signals into corresponding analog signals and multiplying said corresponding analog signals and said basic analog correction signal to produce converted analog correction signals corresponding to said plurality of correction means; and
   corrector means, receiving said converted analog correction signals, for supplying said converted analog correction signals to the corresponding correction means.

2. An image correction apparatus according to claim 1, wherein said correction signal generation means comprises:
   means of generating a correction waveform which is synchronous with a sync signal of a color television signal; and
   means for generating control signals for various kinds of control.

3. An image correction apparatus according to claim 1, wherein said serial data input conversion means receive the output of said correction signal generating means at a reference voltage terminal and the digital correction signals at a data input terminal.

4. An image correction apparatus according to claim 1, wherein said corrector means implements automatic image adjustment by driving said correction means in response to said converted analog corrections signals.

5. An image correction apparatus comprising:
   display means for displaying image information received by a color television receiver;
   serial signal producing means for storing various digital correction data and producing a serial signal representing said correction data;
   correction signal generation means for generating a correction signal;
   serial data input conversion means for receiving said serial signal from said serial signal producing means, implementing digital-to-analog conversion of said serial signal into an analog signal and multiplying said analog signal and said correction signal to produce an output signal; and
   a plurality of correction means for adjusting an image displayed by said display means in accordance with said output signal.

6. An image correction apparatus comprising:
   display means for displaying image information received by a color television receiver;
   memory means for digitally storing various correction data for adjusting the image information;
   conversion means for reading said correction data out of said memory means and implementing digital-to-analog conversion of said data;
   generation means for generating a correction signal needed by said display means;
   multiplication means for multiplying said correction signal and the correction data from said conversion means to produce a multiplication output signal;
   creation means for setting a plurality of adjustment points on a screen of said display means and implementing data interpolation between adjustment points to thereby create a whole screen correction data output;
   summing means for summing said multiplication output signal and said whole screen correction data output; and
   correction means for adjusting said image information displayed on said display means,
   said correction means being driven by the outputs of said summing means and said multiplication means.

7. An image correction apparatus comprising:
   display means for displaying image information received by a color television receiver;
   memory means for digitally storing various correction data for adjusting the image information;
   conversion means for reading out said correction data and implementing digital-to-analog conversion of said data;
   generation means for generating a correction signal needed by said display means; p1 multiplication means for multiplying the correction signal and the correction data from said conversion means to produce a multiplication output signal;
   correction means for adjusting the image information displayed on said display means;
   projection means for projecting a correction pattern signal based on various kinds of correction;
   detection means for obtaining a detection signal for correction from the correction pattern signal;
   computation means for calculating detection-correction data from the detection signal; and
   modification means for modifying various stored correction data in response to the detection-correction data;
   said correction means being driven by said multiplication output signal.

8. An image correction apparatus comprising:
   display means for displaying image information received by a color television receiver;
   memory means for digitally storing various correction data for adjusting the image information;
   conversion means for reading out the correction data and implementing digital-to-analog conversion of said data;
   generation means for generating a correction signal needed by said display means;
   multiplication means for multiplying the correction signal and the correction data from said conversion means to produce a multiplication output signal;
   creation means for setting a plurality of adjustment points on a screen of said display means and implementing data interpolation between adjustment points to thereby create a whole screen correction data output;
   summing means for summing said multiplication output signal and said whole screen correction data output;
   pattern generation means for projecting a correction pattern signal on said display means, said correction pattern signal being based on a type of correction to be performed;
   detection means for obtaining a detection signal for correction from the correction pattern signal;
   computation means for calculating detection-correction data from the detection signal; and
   correction means for adjusting the image information displayed on said display means;
   said various stored correction data and said whole screen correction data output being modified by the detection-correction data, said correction means being driven by the outputs of said summing means and said multiplication means.

9. An image correction apparatus comprising:
   display means for displaying image information;
   correction signal generating means for generating a basic analog correction signal for said display means;
   a plurality of correction means for adjusting an image displayed by said display means;
   serial signal producing means for producing a serial digital signal by multiplexing correction data having addresses corresponding to said plurality of correction means;
   serial data input conversion means for receiving said serial digital signal from said serial signal producing means, implementing digital-to-analog conversion of said serial digital signal into a corresponding analog signal and multiplying said corresponding analog signal and said basic analog correction signal to produce converted analog correction signals corresponding to said plurality of correction means; and corrector means, receiving said converted analog correction signals, for supplying said converted analog correction signals to the corresponding correction means.

* * * * *